(12) United States Patent
Wantin

(10) Patent No.: US 8,562,018 B1
(45) Date of Patent: Oct. 22, 2013

(54) INFLATABLE CURTAIN WITH PASSIVE PRETENSIONER

(75) Inventor: Gregory A. Wantin, St. Clair, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/598,779

(22) Filed: Aug. 30, 2012

(51) Int. Cl.
*B60R 21/16* (2006.01)
(52) U.S. Cl.
USPC .................................................. 280/730.2
(58) Field of Classification Search
USPC .................................. 280/730.2, 743.1, 743.2
See application file for complete search history.

(56) References Cited

U.S. PATENT DOCUMENTS

| | | | |
|---|---|---|---|
| 6,308,982 B1 * | 10/2001 | Wallner et al. | 280/730.2 |
| 6,508,487 B2 * | 1/2003 | Koster | 280/730.2 |
| 6,634,671 B2 * | 10/2003 | Heigl et al. | 280/743.2 |
| 6,709,010 B2 | 3/2004 | Dominissini et al. | |
| 8,439,397 B1 * | 5/2013 | Steinbrecher | 280/730.2 |
| 2002/0175502 A1 * | 11/2002 | Tesch et al. | 280/730.2 |
| 2003/0111828 A1 * | 6/2003 | Dominissini | 280/730.2 |

FOREIGN PATENT DOCUMENTS

KR     2006007072 A  *  1/2006

\* cited by examiner

*Primary Examiner* — Faye M. Fleming
(74) *Attorney, Agent, or Firm* — Tarolli, Sundheim, Covell & Tummino LLP

(57) ABSTRACT

An apparatus (10) for helping to protect an occupant of a vehicle (12) that has a side structure (16) and a roof (18) includes an inflatable curtain (14) inflatable away from the roof adjacent the side structure of the vehicle. A pretensioner (150) connects the curtain (14) to the vehicle (12) and includes rotational element. The inflatable curtain (14) is connected to the rotational element and upon deployment applies a force to the rotational element that causes the rotational element to rotate. The rotational element is configured such that angular momentum causes the rotational element to continue to rotate and thereby tension the inflatable curtain (14).

21 Claims, 5 Drawing Sheets

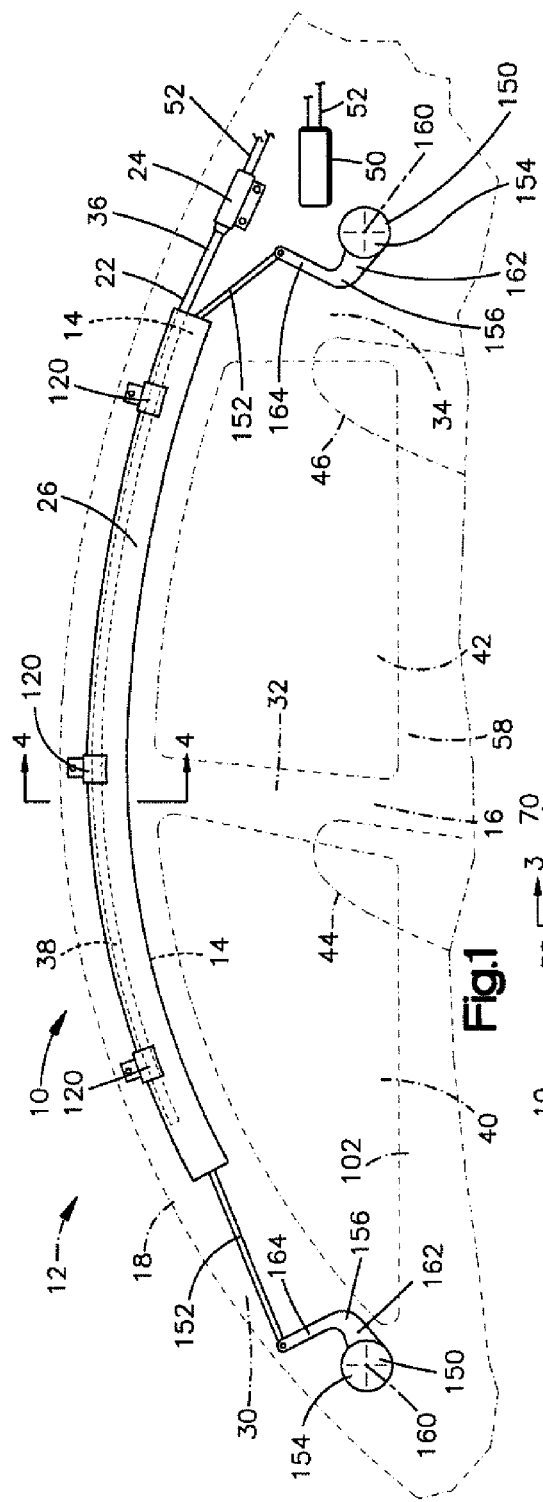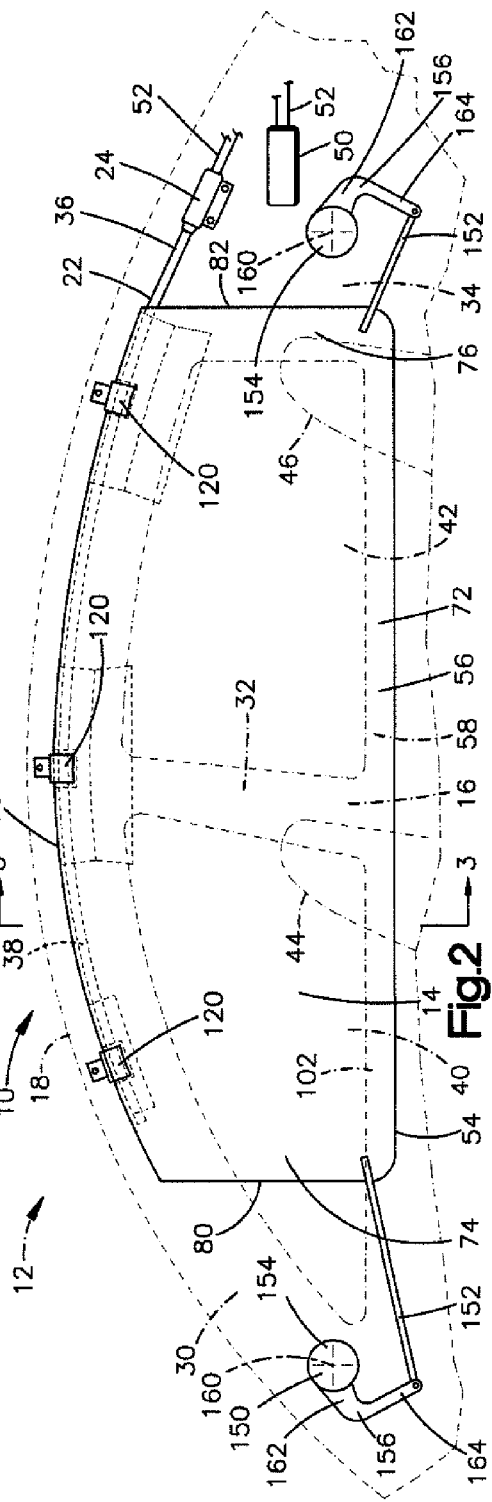

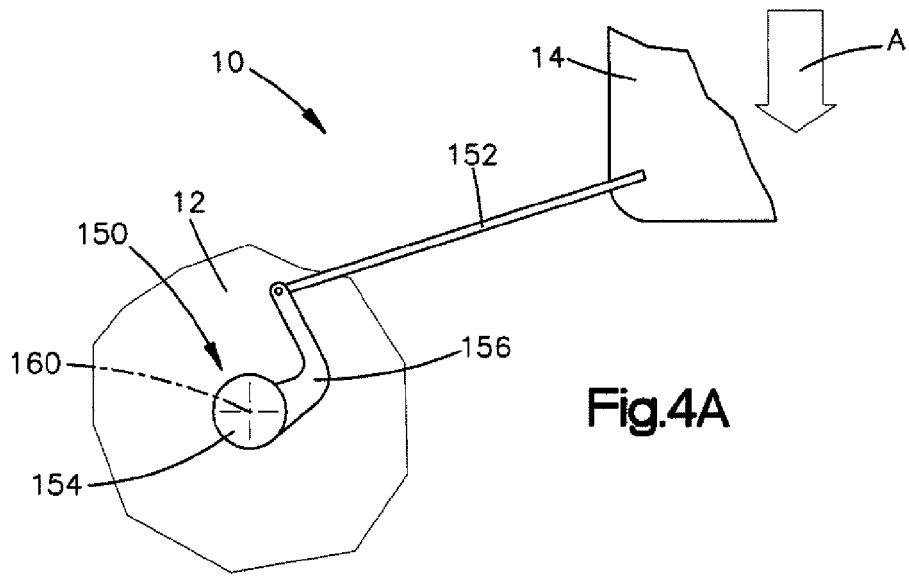
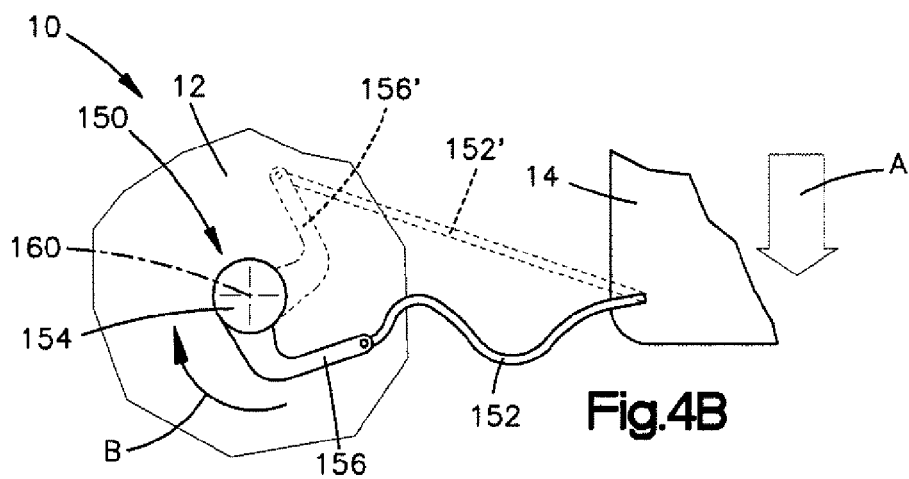
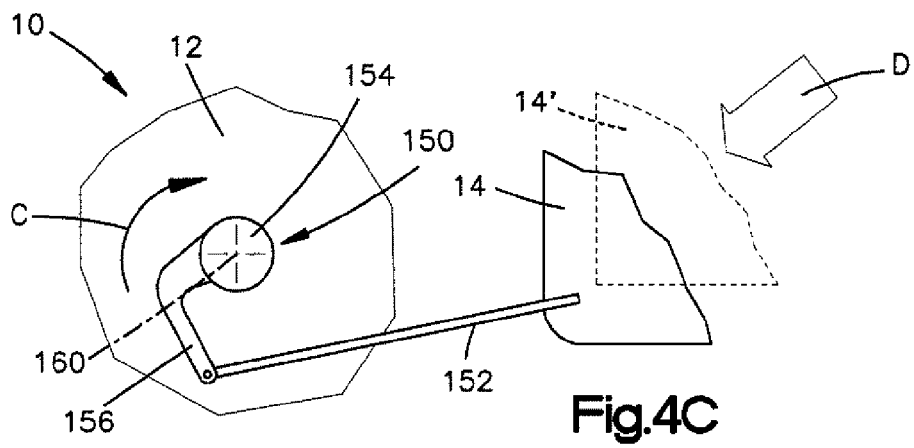

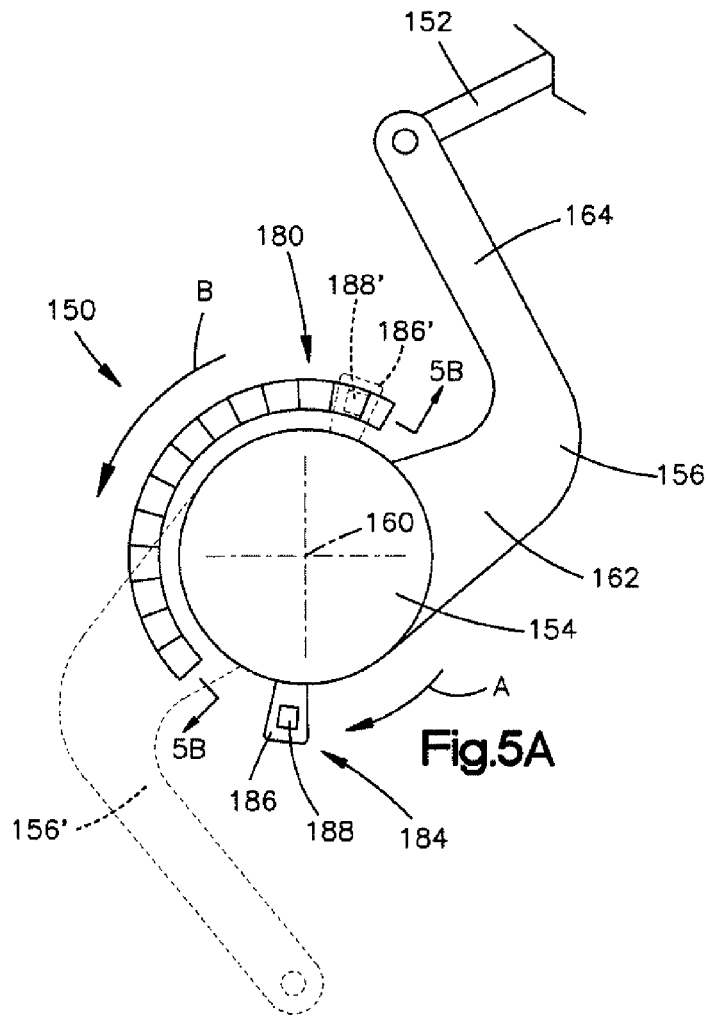
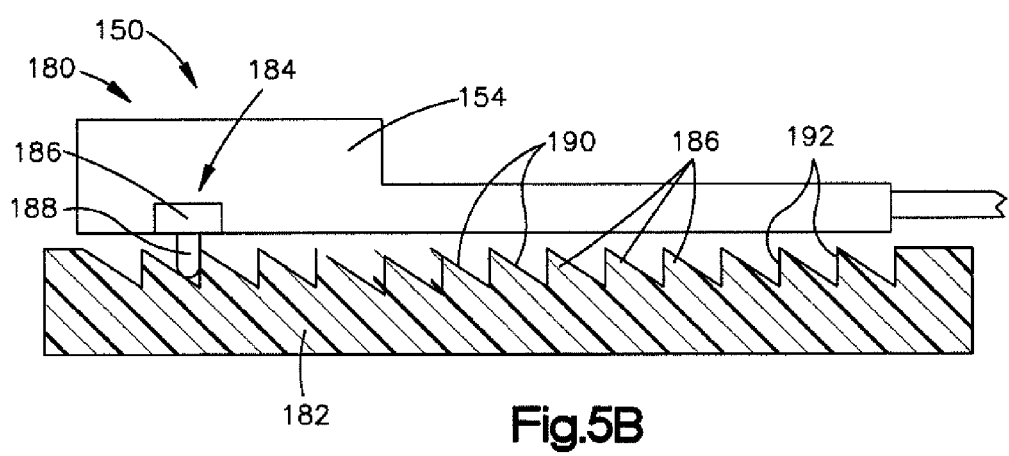

INFLATABLE CURTAIN WITH PASSIVE PRETENSIONER

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant. One particular type of inflatable vehicle occupant protection device is an inflatable curtain. The inflatable curtain is inflatable away from the roof of the vehicle between a vehicle occupant and the side structure of the vehicle in response to a side impact to the vehicle and/or a vehicle rollover. A known inflatable curtain is inflated from a deflated condition with inflation fluid directed from an inflator to the inflatable curtain.

SUMMARY OF THE INVENTION

The present invention relates to an apparatus for helping to protect an occupant of a vehicle that has a side structure and a roof includes an inflatable curtain inflatable away from the roof adjacent the side structure of the vehicle. A pretensioner connects the curtain to the vehicle and includes rotational element. The inflatable curtain is connected to the rotational element and upon deployment applies a force to the rotational element that causes the rotational element to rotate. The rotational element is configured such that angular momentum causes the rotational element to continue to rotate and thereby tension the inflatable curtain.

The present invention also relates to a pretensioner for applying a pretensioning force to an inflatable curtain. The pretensioner includes a rotational element connectable to the inflatable curtain. The rotational element is configured such that deployment of the inflatable curtain causes the rotational element to rotate in a first direction. The rotational element is configured to continue rotating in the first direction due to angular momentum after the force applied by the inflating curtain is relieved. The continued rotation of the rotational element applies a tensioning force on the inflatable curtain.

The present invention further relates to a method for pretensioning an inflatable curtain that is inflatable away from the vehicle roof to a position adjacent the side structure of the vehicle. The method includes fixing a pretensioner to the vehicle, the pretensioner including a rotational element that is rotatable relative to the vehicle. The method also includes connecting the inflatable curtain to the rotational element so that deployment of the inflatable curtain applies a force to the rotational element that causes the rotational element to rotate about the axis. The method further includes configuring the rotational element such that angular momentum causes the rotational element to continue to rotate and thereby tension the inflatable curtain.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated and stored condition in a vehicle, according the present invention;

FIG. 2 is a schematic view of the apparatus of FIG. 1 in an inflated condition in the vehicle;

FIGS. 4A-4C are schematic views illustrating portions of the apparatus at different stages of operation;

FIGS. 5A and 5B are schematic views illustrating a portion of the apparatus according to an example embodiment.

DESCRIPTION OF AN EMBODIMENT

Figure 3:
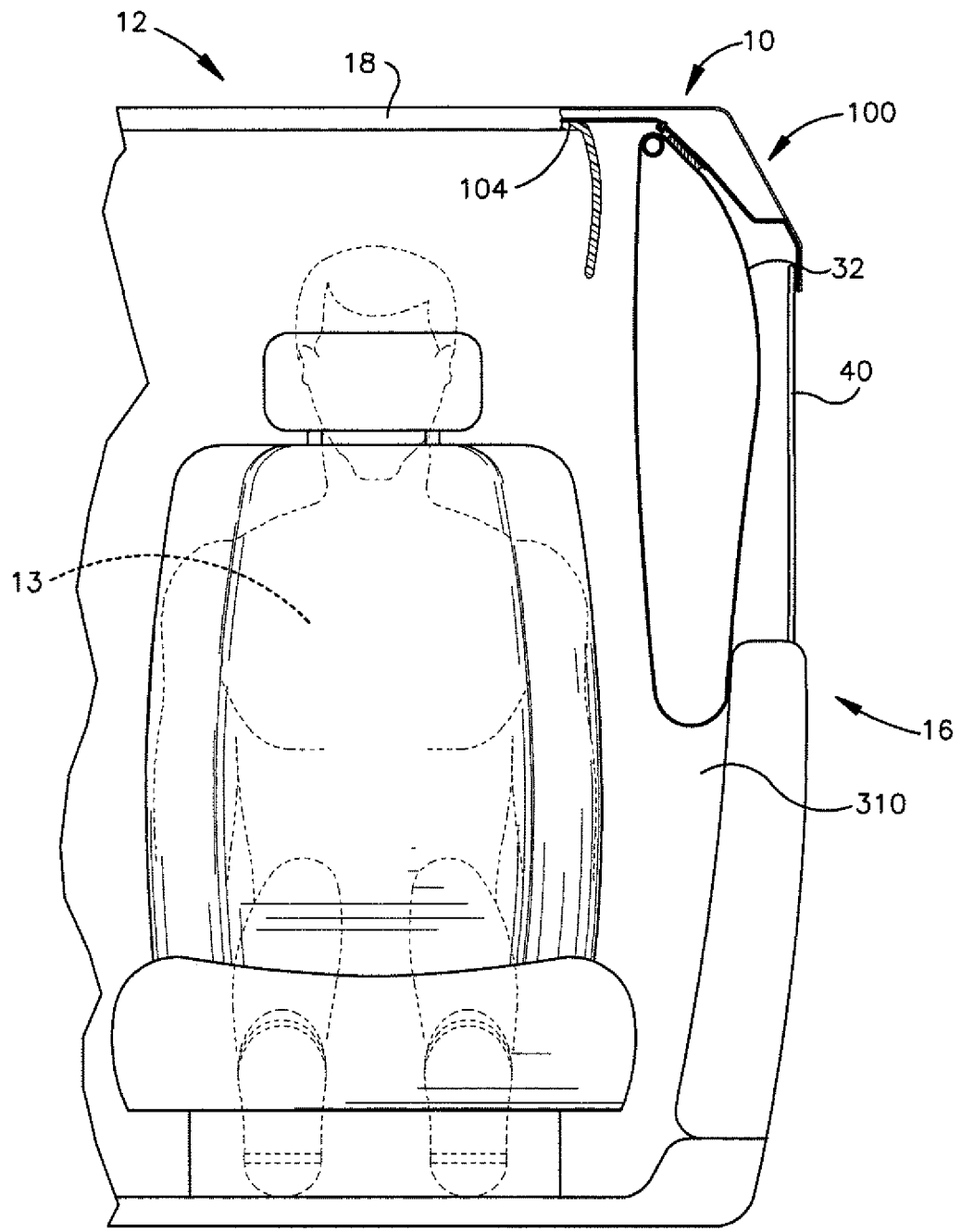
FIG. 3 is a sectional view taken generally along line 3-3 in FIG. 2.

Representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes an A pillar 30, a B pillar 32, a C pillar 34, and front and rear side windows 40 and 42. The vehicle 12 also includes front vehicle seating 44 positioned adjacent the front side window 40 and rear vehicle seating 46 positioned adjacent the rear side window 42.

An inflator 24 is connected in fluid communication with the inflatable curtain 14 through a fill tube 22. The fill tube 22 may be constructed of any suitable material, such as metal, plastic, or fabric. The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14. Alternatively, the fill tube 22 could be omitted, in which case the inflator 24 could deliver inflation fluid directly into the inflatable curtain 14.

The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 may include a cover 26 (FIG. 1), such as a fabric sheath or plastic housing, that helps support the inflatable curtain 14 in a stored and deflated condition. The deflated inflatable curtain 14 and the cover 26 have an elongated configuration and extend along the vehicle roof 18 and along the side structure 16 of the vehicle 12 above the side windows 40 and 42. The fill tube 22, inflatable curtain 14, and cover 26 are connected to the vehicle 12 by fastening means 120, such as support clips or brackets secured by threaded fasteners.

The inflatable curtain 14 (FIG. 3) includes panels of material that are arranged in an overlying manner. Overlapping portions of the panels are interconnected along at least a portion of a perimeter 54 of the inflatable curtain 14 to form a perimeter connection 56 of the curtain. The perimeter connection 56 helps define an inflatable volume of the inflatable curtain 14. The inflatable curtain 14 may also include interior connections (not shown) in which the overlying panels are interconnected within the perimeter 54 to form non-inflatable portions that help define inflatable chambers of the curtain.

The inflatable curtain 14 may be formed in a variety of manners, such as by weaving the overlying panels in a one piece woven construction, stitching the panels together, or interconnecting the panels via ultrasonic welding, heat bonding, or adhesives. In a one piece woven construction, the overlying panels may be woven simultaneously from a material, such as nylon yarn. The inflatable curtain 14 may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The perimeter 54 of the inflatable curtain 14 is defined at least partially by an upper edge 70, an opposite lower edge 72 of the curtain, and front and rear portions 74 and 76, respectively, of the inflatable curtain spaced apart horizontally along the upper and lower edges. The front and rear portions 74 and 76 of the inflatable curtain 14 include front and rear edges 80 and 82, respectively, that are spaced horizontally apart along the upper and lower edges 70 and 72 and extend between the upper and lower edges.

As illustrated in FIG. 3, a vehicle roof rail 100 is located at the intersection of the side structure 16 of the vehicle 12 and the vehicle roof 18. The inflatable curtain 14, fill tube 22, and cover 26 can be assembled as a module that can be installed in the vehicle 12 as a unit. The module is connected to the vehicle 12 by the fastening means 120.

Referring to FIGS. 1 and 2, the apparatus 10 includes one or more pretensioners 150 for pretensioning the inflatable curtain 14. By "pretensioning," it is meant that the pretensioners 150, upon deployment of the inflatable curtain 14, apply a tensioning force to the curtain. The pretensioning could be in a downward direction in which tension is applied to the inflatable curtain 14 between the pretensioner 150 and the vehicle roof 18. The pretensioning could also be in a lengthwise, forward/rearward direction in which tension is applied to the inflatable curtain 14 lengthwise in the vehicle 12 between pretensioners 150 at opposite ends of the curtain or between a pretensioner at one end and an opposite anchored portion of the curtain. As a further alternative, the pretensioning could be in an angular direction in which the tension applied to the curtain by the pretensioner 150 has both downward and forward/rearward components. The tensioning force can, for example, help the inflatable curtain 14 to prevent an occupant or portions of the occupant from moving through the window openings 40.

The apparatus 10 of the embodiment of FIGS. 1 and 2 includes two pretensioners 150, each of which are mounted or otherwise secured to the vehicle side structure 16. A first or forward one of the pretensioners 150 is located on or near the A-pillar 30. The forward pretensioner 150 is secured to the inflatable curtain 14 by a flexible elongated member 152, such as a tether. The tether 152 has a first end connected to the forward pretensioner and an opposite second end connected to the inflatable curtain 14 at or near a corner of the curtain located adjacent or near the intersection of the lower edge 72 and front edge 80 of the curtain.

A second or rearward one of the pretensioners 150 is located on or near the C-pillar 34. The rearward pretensioner 150 is secured to the inflatable curtain 14 by a flexible elongated member 152, such as a tether. The tether 152 has a first end connected to the forward pretensioner and an opposite second end connected to the inflatable curtain 14 at or near a corner of the curtain located adjacent or near the intersection of the lower edge 72 and rear edge 82 of the curtain.

The pretensioners 150 are mounted to the vehicle 12 such that they are at least partially positioned below a vehicle belt line, which is identified generally at 58. The belt line 58 is defined generally as the portion of the side structure that extends along the length of the passenger compartment along the lower edge of the window openings 40 and 42. As shown in FIGS. 1 and 2, the pretensioners 150 are positioned such that the portion connected to the tethers 152 is positioned below the belt line 58 when the curtain is deployed and the pretensioners are actuated.

The pretensioners 150 are rotational elements and are accordingly connected to the vehicle 12 in a manner such that they can rotate relative to the vehicle, more particularly relative to the side structure 16. In the embodiment of FIGS. 1 and 2, each pretensioner 150 includes a central hub 154 and a tensioning arm 156 that extends radially from the hub. The hub 154 and tensioning arm 156 form the rotational element of the pretensioner 150 in FIGS. 1 and 2. The hub 154 is rotatable about an axis 160. In the illustrated embodiment, the tensioning arm 156 is an angled member with a first portion 162 that projects radially from the hub 154 and a second portion 164 that extends at an angle from the first portion. The tether 152 is connected to the second portion 164 of the tensioning arm 156.

The pretensioners 150 illustrated in FIGS. 1 and 2 are mirror images of each other and are configured to rotate in tensioning directions that are opposite each other. The pretensioner 150 mounted on the A-pillar 30 is configured for clockwise rotation about its axis 160. The pretensioner 150 mounted on the C-pillar 34 is configured for counterclockwise rotation about its axis 160.

Each pretensioner 150 has a locking feature that blocks rotation in a direction opposite its tensioning direction. The blocking feature of the pretensioner 150 can have various configurations. One such configuration is illustrated in FIGS. 5A and 5B. Referring to FIGS. 5A and 5B, the pretensioner 150 includes a rack mechanism 180 for controlling rotation of the hub 154 and tensioning arm 156. The rack mechanism 180 includes a rack 182 that is fixed to the vehicle and a pin assembly 184 that is fixed to the hub 152. The hub 152/tensioning arm 154 are connected to the vehicle and rotatable relative to the vehicle and relative to the rack 182.

The rack 182 has a generally round, curved configuration and is positioned concentrically with the axis 160 of the hub 152. The pin assembly 184 protrudes radially from the hub 152 and is positioned such that it follows an arcuate path above the rack 182 as the hub rotates. The rack 182 includes rack teeth 186 spaced along its length. Each of the rack teeth 182 includes a sliding surface 190 and a blocking surface 192.

The pin assembly 184 includes a pin 186 housed in a support 188. The pin 186 is biased, e.g., spring biased in the support 188 to move downward as viewed in FIG. 5B into engagement with the rack teeth 182. The spring biased pin 186 is movable upward against the spring bias. As the hub 154 (and tensioning arm 156) rotates in a clockwise direction (arrow A), the pin assembly 184 follows the arcuate path of the rack 180. The pin 192 rides against the rack teeth 182, sliding on the sliding surface 190 and moving upward against the spring bias, and latches or snaps down under the spring bias to a position along and against the blocking surface 192. If the hub 154 rotates in a counterclockwise direction (arrow B), the pin 184 slides on the sliding surface 190 until it reaches a blocking surface 192, which will engage the pin and thereby block further counterclockwise rotation of the hub. The rack mechanism 180 thus permits rotation in the tensioning direction (clockwise in FIGS. 5A and 5B) and blocks rotation in the direction opposite the tensioning direction (counterclockwise).

Figure 6:
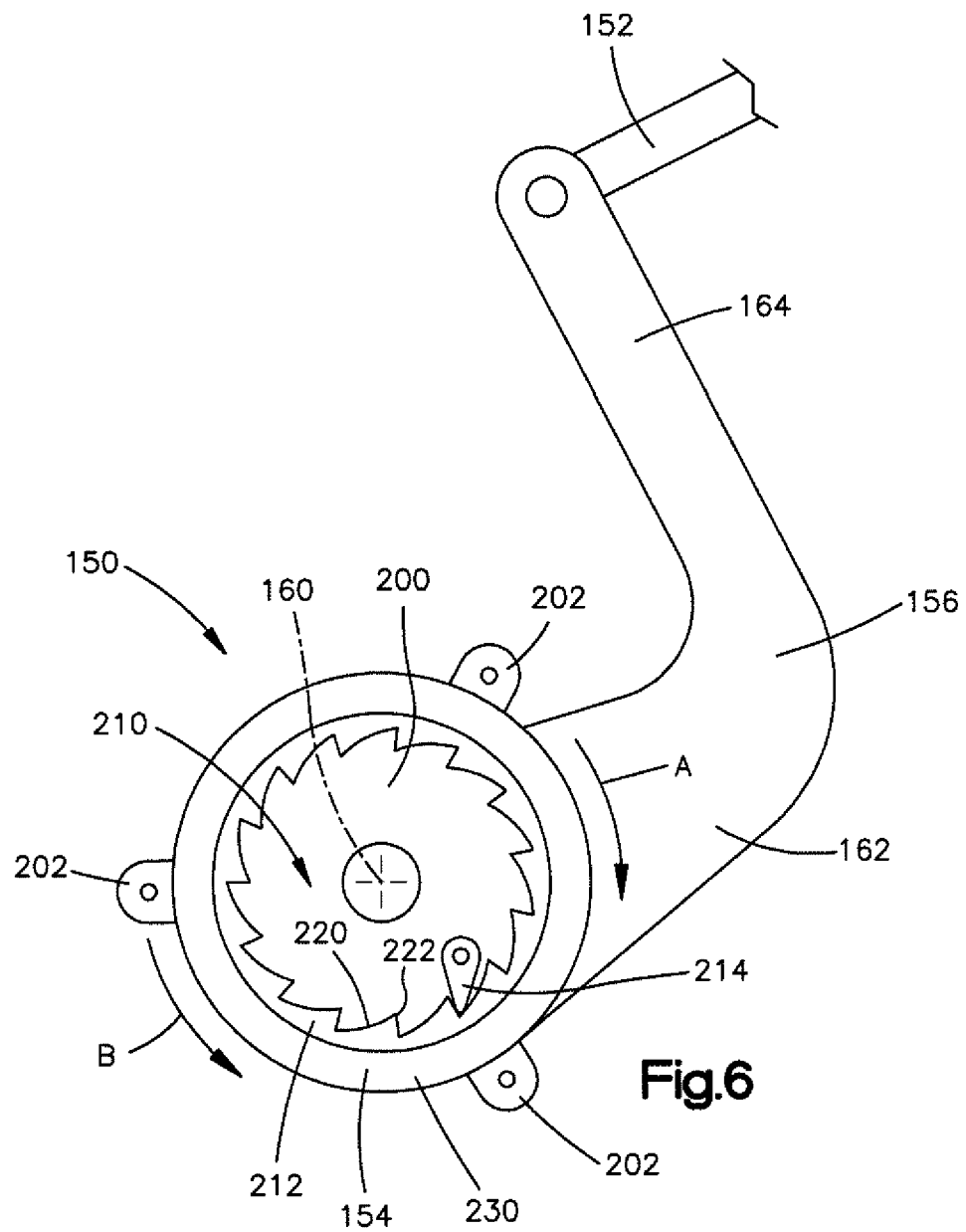
FIG. 6 is a schematic view illustrating a portion of the apparatus according to another example embodiment.

Another configuration of the blocking feature of the pretensioner 150 is illustrated in FIG. 6. Referring to FIG. 6, the pretensioner 150 includes a ratcheting mechanism 210 for controlling rotation of the hub 154 and tensioning arm 156 relative to a base 200 of the pretensioner. The base 200 includes portions 202 for facilitating connecting the pretensioner 150 to the vehicle.

The ratcheting mechanism 210 includes ratcheting teeth 212 that are formed as a portion of the hub 154 and a pawl 214 that is secured to the base 200. Each of the ratcheting teeth 212 includes a sliding surface 220 and a blocking surface 222. The pawl 214 is biased, e.g., spring biased, into engagement with the ratcheting teeth 212. As the hub 154 (and tensioning arm 156) rotates in a clockwise direction (arrow A), the pawl 222 rides against the ratcheting teeth 212, sliding on the sliding surface 220 and ratcheting over the blocking surface 222. If the hub 154 rotates in a counterclockwise direction (arrow B), the pawl 214 slides on the sliding surface 220 until it reaches a blocking surface 222, which will engage the pawl and thereby block further counterclockwise rotation of the hub. The ratchet mechanism 210 thus permits rotation in the tensioning direction (clockwise in FIG. 6) and blocks rotation in the direction opposite the tensioning direction (counterclockwise).

The vehicle 12 includes a sensor mechanism 50 (shown schematically in FIGS. 1 and 2) for sensing the occurrence of an event for which inflation of the inflatable curtain 14 is desired, such as a side impact to the vehicle 12 and/or a vehicle rollover. Upon sensing the occurrence of such an event, the sensor mechanism 50 provides an electrical signal over lead wires 52 to the inflator 24. The electrical signal causes the inflator 24 to be actuated in a known manner. The inflator 24, when actuated, discharges fluid under pressure into the inflatable curtain 14.

The inflatable curtain 14 inflates under the pressure of the inflation fluid from the inflator 24. This causes the cover 26 to open, which permits the curtain 14 to inflate away from the roof 18 in a downward direction as shown in the drawings and in a downward direction with respect to the direction of forward travel of the vehicle 12 into the position illustrated in FIGS. 2 and 5.

The inflatable curtain 14, when inflated, extends along the side structure 16 of the vehicle 12 and is positioned between the side structure and any occupant of the vehicle. The inflatable curtain 14 covers portions of the vehicle side structure that extend between the A pillar 30 and the C pillar 34 of the vehicle 12 and may overlie portions of the A pillar, C pillar, and the B pillar 32 of the vehicle. The inflatable curtain 14, when inflated, may be positioned between the vehicle side structure 16 and the front and rear vehicle seating 44 and 46. The inflatable curtain 14, when inflated, helps to protect a vehicle occupant in the event of a vehicle rollover or a side impact to the vehicle 12. The inflatable curtain 14, when inflated, also helps to absorb the energy of impacts with the curtain and helps to distribute the impact energy over a large area of the curtain.

Those skilled in the art will appreciate that the extent and coverage of the inflatable curtain 14 in the vehicle 12 may vary. For example, the extent and coverage of the inflatable curtain 14 may vary depending on a variety of factors, such as the architecture of the vehicle 12, the position of the inflatable curtain in the vehicle, and the desired extent or coverage of the inflatable curtain.

As the inflatable curtain 14 inflates and deploys, it tensions the tether 152 which in turn pulls on the pretensioner 150. This tension causes the hub 154 and tensioning arm 156 to rotate relative to the vehicle. In the embodiment illustrated in FIGS. 1 and 2, this rotation is clockwise for the pretensioner 150 on the A-pillar 30 and counterclockwise for the pretensioner on the C-pillar 34.

According to the invention, the pretensioner 150 uses angular momentum, sometimes referred to as moment of inertia or rotational inertia, to tension the inflatable curtain. This is illustrated in FIGS. 4A-4C. Referring to FIG. 4A, as the inflatable curtain 14 deploys in the generally downward direction indicated by the arrow labeled "A," the curtain pulls the tether 152 downward. Depending on the configuration of the apparatus 10, during the initial phases of deployment, the tether 152 can immediately apply tension to the tensioning arm 156 or tension can be applied to the tensioning arm at some point beyond the initial phases of deployment.

Referring to FIG. 4B, when the deploying inflatable curtain 14 reaches the point at which it tensions the tensioning arm 156 via the tether 152, further deployment causes the pretensioner 150, particularly the hub 154 and attached tensioning arm 156, to rotate about the axis 160. As shown in FIG. 4B, this may occur, for example, once the point on the inflatable curtain 14 to which the tether is attached (the corner illustrated in FIGS. 4A-4C) moves below the point on the initially positioned tensioning arm (see 156') where the tether (see 152') is attached.

The deploying curtain 14 accelerates rotation of the pretensioner 150 quickly due to the speed and force with which the curtain deploys. Because of this, and according to the present invention, once the inflatable curtain 14 reaches a predetermined stage of deployment due to inflation, the pretensioner 150 continues to rotate (see arrow B) due to its own angular momentum. Depending on the configuration of the apparatus 10, as the pretensioner 150 continues to rotate due to angular momentum, the tether 152 can become momentarily slacked as the rotating tensioning arm 156 moves toward the inflatable curtain 14, as shown at 152 in FIG. 4B.

Under its own angular momentum, the pretensioner 150 continues to rotate, as indicated by the arrow C in FIG. 4C. It is now that the continued rotation of the pretensioner 150 is such that the tensioning arm 156 moves away from the deployed inflatable curtain 14. Because of this, the pretensioner 150 now applies a pretensioning force, indicated generally by the arrow D, that pulls the inflatable curtain from the position illustrated at 14' toward that illustrated at 14. This pretensioning force can be applied primarily along the lower edge or lower edge portion of the inflatable curtain 14. Because the pretensioners 150 (at least the portions of the tensioning arms 156 to which the tethers 152 are connected) are positioned below the belt line 58 (see FIG. 2), they can tension the inflatable curtain 14 below the lower portion of the window openings 40, 42. Thus, the apparatus 10 can be configured to help improve the degree to which the apparatus 10 helps prevent an occupant or portions of an occupant from moving through the window openings 40, 42.

The predetermined stage of deployment of the inflatable curtain 14 after which the rotating pretensioner 150 continues to rotate due to angular momentum can be configured through the positioning of the pretensioner on the vehicle 12 and through the configuration of the pretensioner itself and the configuration of the curtain and tether 152. For example, in the embodiment illustrated in FIGS. 1, 2, and 4A-4C, the portion of the inflatable curtain 14 to which the tether 152 is connected is positioned near the belt line 58 in the fully deployed condition of the curtain (see FIG. 2) and the portion of the tensioning arm 156 to which the tether is connected is located substantially above the belt line in the pre-deployed condition (see FIG. 1). Therefore, when the inflating curtain 14 deploys and applies the force on the pretensioner 150 causing it to rotate, the force is applied until the curtain reaches a substantially fully deployed condition. It is once the inflatable curtain 14 reaches this condition of substantially full deployment that the rotation inducing force is relieved and the pretensioner 150 continues to rotate due to angular momentum.

As the pretensioner 150 rotates, the blocking feature permits rotation in the tensioning direction and blocks rotation in the opposite direction, thus maintaining the tension applied by the pretensioner at the furthest point, i.e., at the point of highest tension. For example, for the rack mechanism 180 of FIGS. 5A and 5B, as the pretensioner 150/hub 154/tensioning arm 156 rotates, the pin 192 rides against the rack teeth 182, sliding on the sliding surface 190 and latching or snapping down along and against the blocking surface 192. Once the rotation ceases, the pin 184 engages the blocking surface 192, which prevents rotation in the opposite direction (i.e., counterclockwise in FIGS. 4A-4C) thereby allowing the pretensioner 150 to maintain the tension applied to the inflatable curtain 14.

For the ratcheting mechanism of FIG. 6, as the pretensioner 150/hub 154/tensioning arm 156 rotates, the pawl 222 rides against the ratcheting teeth 212, sliding on the sliding surface 220 and ratcheting over the blocking surface 222. Once the rotation ceases, the pawl 222 engages the blocking surface 222, which prevents rotation in the opposite direction (i.e., counterclockwise in FIGS. 4A-4C) thereby allowing the pretensioner 150 to maintain the tension applied to the inflatable curtain 14.

The degree to which the pretensioner 150 can pretension the inflatable curtain 14 can be affected by the magnitude or amount of angular momentum exhibited by the rotating hub 154/tensioning arm 156. Since angular momentum is directly related to the mass of the rotating object and the location or distribution of that mass relative to the center of rotation, according to the present invention, the pretensioner 150 may be configured such that its mass helps to improve or optimize the angular momentum generated during its use. For example, referring to FIG. 6 for example, the hub 154, the tensioning arm 156, or both the hub and the tensioning arm may have a configuration and material construction selected to increase the mass of the pretensioner 150 and the distribution of the mass. Thus, portions of the pretensioner 150, such as the tensioning arm 156 and an outer wall 230 of the hub 154 may be thickened or oversized, and constructed of a high mass material, such as a solid metal or metal alloy, e.g., steel. Such a construction would provide a pretensioner 150 that has a comparatively large inertial mass for helping to maximize the tension applied to the inflatable curtain 14. By moving mass away from the axis 160, e.g., to the outer wall of the hub 154 and/or the tensioning arm 156, the angular momentum exhibited by the pretensioner 150 while rotating can be increased.

From the above description of the invention, those skilled in the art will perceive improvements, changes and modifications. For example, in the embodiment of FIGS. 1 and 2, there are two pretensioners 150 that tension the inflatable curtain in opposite directions along the vehicle side structure 16 in the manner described hereinabove. Those skilled in the art, however, will appreciate that a single pretensioner 150 could also be used to apply tension to the curtain 14 in a similar or identical manner, for example, with the opposite end of the curtain being anchored with a tether fixed directly to the vehicle 12. Additionally, the pretensioner 150 may have shapes and/or configurations that differ from those set forth in the illustrated embodiments. For example, the tensioning arm 156 could be omitted, in which the pretensioner could comprise a rotating mass (e.g., a cylindrical mass) in to which the tether 152 is connected at a periphery or other location spaced from its axis of rotation. Other such improvements, changes and modifications within the skill of the art are intended to be covered by the appended claims.

Having described the invention, the following is claimed:

1. An apparatus for helping to protect an occupant of a vehicle that has a side structure and a roof, the apparatus comprising:
    an inflatable curtain that is inflatable away from the vehicle roof to a position adjacent the side structure of the vehicle; and
    a pretensioner for connecting the curtain to the vehicle, the pretensioner comprising a rotational element that is rotatable relative to the vehicle, the inflatable curtain being connected to the rotational element;
    the inflatable curtain upon deployment applying a force to the rotational element that causes the rotational element to rotate, the rotational element being configured such that angular momentum causes the rotational element to continue to rotate and thereby tension the inflatable curtain.

2. The apparatus recited in claim 1, wherein the inflatable curtain is connected to the rotational element at a location on the rotational element that is spaced from an axis of rotation of the rotational element.

3. The apparatus recited in claim 1, wherein the inflatable curtain applies the force to the rotational element until the curtain reaches a predetermined deployed condition, at which point further rotation of the rotational element due to angular momentum applies tension to the inflatable curtain.

4. The apparatus recited in claim 1, wherein the rotational element comprises a hub and a tensioning arm that extends radially from the hub, the inflatable curtain being connected to the tensioning arm.

5. The apparatus recited in claim 1, further comprising a tether that connects the inflatable curtain to the pretensioner, the pretensioner tensioning the inflatable curtain via the tether.

6. The apparatus recited in claim 1, wherein the pretensioner when mounted to the vehicle is positioned at least partially below a vehicle belt line.

7. The apparatus recited in claim 1, wherein the inflatable curtain is connected to the pretensioner along a lower edge of the curtain.

8. The apparatus recited in claim 7, wherein the inflatable curtain is connected to the pretensioner adjacent a corner of the curtain.

9. The apparatus recited in claim 1, wherein the pretensioner further comprises a locking mechanism for blocking rotation of the rotational element in a direction opposite the direction of rotation imparted by the deploying curtain.

10. The apparatus recited in claim 9, wherein the locking mechanism comprises one of a rack mechanism and a ratcheting mechanism.

11. The apparatus recited in claim 9, wherein the locking mechanism is located internally within the rotational element.

12. The apparatus recited in claim 1, wherein the rotational element comprises an inertial mass that when rotated by the deploying curtain has an angular momentum sufficient to apply a tensioning force to the inflatable curtain.

13. The apparatus recited in claim 12, further comprising a tether that connects the inflatable curtain to the rotational element, the rotational element tensioning the tether to apply the tensioning force to the inflatable curtain.

14. A pretensioner for applying a pretensioning force to an inflatable curtain, the pretensioner comprising:
a rotational element connectable to the inflatable curtain, the rotational element being configured such that deployment of the inflatable curtain causes the rotational element to rotate in a first direction, the rotational element being configured to continue rotating in the first direction due to angular momentum after the force applied by the inflating curtain is relieved, the continued rotation of the rotational element applying a tensioning force on the inflatable curtain.

15. The pretensioner recited in claim 14, further comprising a locking mechanism for blocking rotation of the rotational element in a second direction opposite the first direction in order to maintain the tension applied to the inflatable curtain by the rotational element.

16. The apparatus recited in claim 15, wherein the locking mechanism comprises one of a rack mechanism and a ratcheting mechanism.

17. The apparatus recited in claim 15, wherein the locking mechanism is located internally within the rotational element.

18. The apparatus recited in claim 14, wherein the rotational element comprises a hub and a tensioning arm that extends radially from the hub, the inflatable curtain being connected to the tensioning arm.

19. A method for pretensioning an inflatable curtain that is inflatable away from the vehicle roof to a position adjacent the side structure of the vehicle, the method comprising:
fixing a pretensioner to the vehicle, the pretensioner comprising a rotational element that is rotatable relative to the vehicle
connecting the inflatable curtain to the rotational element so that deployment of the inflatable curtain applies a force to the rotational element that causes the rotational element to rotate about the axis; and
configuring the rotational element such that angular momentum causes the rotational element to continue to rotate and thereby tension the inflatable curtain.

20. The method recited in claim 19, wherein:
connecting the inflatable curtain comprises connecting the inflatable curtain to the rotational element via a tether; and
configuring the rotational element comprises:
configuring the tether to apply tension to the rotational element when the inflatable curtain deploys, the force applied to the rotational element causing the rotational element to rotate; and
configuring the tether and rotational element such that the rotational element continues to rotate after the inflatable curtain has at least substantially deployed such that the rotational element applies tension to the inflatable curtain via the tether.

21. The method recited in claim 20, further comprising the step of configuring the rotational element with a locking mechanism for blocking rotation of the rotational element in a direction opposite the direction of rotation imparted by the deploying curtain.

* * * * *